United States Patent
Guo et al.

(10) Patent No.: US 12,471,120 B2
(45) Date of Patent: Nov. 11, 2025

(54) HIGH RELIABILITY COMMUNICATION IN VEHICLE-TO-EVERYTHING (V2X) SYSTEMS ON SIDELINK AND RADIO NETWORK LINK INTERFACES

(71) Applicant: QUALCOMM Incorporated, San Diego, CA (US)

(72) Inventors: Hui Guo, Beijing (CN); Shailesh Patil, San Diego, CA (US); Deviprasad Putchala, San Diego, CA (US); Kapil Gulati, Belle Mead, NJ (US); Hao Xu, Beijing (CN)

( * ) Notice: Subject to any disclaimer, the term of this patent is extended or adjusted under 35 U.S.C. 154(b) by 332 days.

(21) Appl. No.: 18/000,625

(22) PCT Filed: Jul. 28, 2020

(86) PCT No.: PCT/CN2020/105136
§ 371 (c)(1),
(2) Date: Dec. 2, 2022

(87) PCT Pub. No.: WO2022/021054
PCT Pub. Date: Feb. 3, 2022

(65) Prior Publication Data
US 2023/0217467 A1    Jul. 6, 2023

(51) Int. Cl.
*H04W 72/40* (2023.01)
*H04L 1/1812* (2023.01)
(Continued)

(52) U.S. Cl.
CPC .......... *H04W 72/40* (2023.01); *H04L 1/1812* (2013.01); *H04W 28/0268* (2013.01); *H04W 92/18* (2013.01)

(58) Field of Classification Search
CPC . H04W 72/40; H04W 28/0268; H04W 92/18; H04W 4/029; H04W 4/44;
(Continued)

(56) References Cited

U.S. PATENT DOCUMENTS 10,219,259 B2    2/2019  Kubota et al.
2019/0028862 A1   1/2019  Futaki
(Continued)

FOREIGN PATENT DOCUMENTS

CN    106302622 A    1/2017
CN    107925906 A    4/2018
(Continued)

OTHER PUBLICATIONS

3GPP 3rd Generation Partnership Project, Technical Specification Group Services and System Aspects, Architecture Enhancements for 5G System (5GS) to Support Vehicle-to-Everything (V2X) Services (Release 16), Draft 3GPP TS 23.287 V16.2.0, Mar. 2020 (Mar. 2020), pp. 1-53, Section 5.4.
(Continued)

*Primary Examiner* — Rushil P. Sampat

(57) ABSTRACT

Certain aspects of the present disclosure provide techniques for wireless communications in a vehicle-to-everything (V2X) system. An example method generally includes receiving, from a user equipment (UE) through a serving network entity, a request for information from the V2X application server, wherein the request includes an indication of a type of the requested information and a location of the UE; identifying one or more parameters for transmission of the requested information to the UE via a transmitter UE; and transmitting, to the serving network entity, the requested information for transmission to the UE through the transmitter UE based on the identified parameters.

31 Claims, 14 Drawing Sheets

(51) Int. Cl.
*H04W 28/02* (2009.01)
*H04W 92/18* (2009.01)

(58) Field of Classification Search
CPC ........... H04W 8/20; H04W 4/02; H04W 4/40;
H04W 4/46; H04W 52/0277; H04W
68/02; H04W 8/26; H04L 1/1812; Y02D
30/70
See application file for complete search history.

(56) References Cited

U.S. PATENT DOCUMENTS

| | | | |
|---|---|---|---|
| 2019/0075447 A1* | 3/2019 | Lee | H04W 68/02 |
| 2019/0289459 A1* | 9/2019 | Shan | H04W 76/25 |
| 2019/0297600 A1 | 9/2019 | Kim et al. | |
| 2021/0258744 A1* | 8/2021 | Lee | H04W 76/14 |

FOREIGN PATENT DOCUMENTS

| | | |
|---|---|---|
| WO | 2017196940 A1 | 11/2017 |
| WO | 2019216738 A1 | 11/2019 |

OTHER PUBLICATIONS

International Search Report and Written Opinion—PCT/CN2020/105136—ISA/EPO—Apr. 26, 2021.
Supplementary European Search Report—EP20947420—Search Authority—The Hague—Mar. 7, 2024.

* cited by examiner

HIGH RELIABILITY COMMUNICATION IN VEHICLE-TO-EVERYTHING (V2X) SYSTEMS ON SIDELINK AND RADIO NETWORK LINK INTERFACES

CROSS-REFERENCE TO RELATED APPLICATIONS

This application is a national stage application under 35 U.S.C. 371 of PCT/CN2020/105136, filed Jul. 28, 2020, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for reliably communicating in vehicle-to-everything (V2X) systems using both sidelink and network link interfaces.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a vehicle-to-everything (V2X) application server. The method generally includes receiving, from a user equipment (UE) through a serving network entity, a request for information from the V2X application server, wherein the request includes an indication of a type of the requested information and a location of the UE; identifying one or more parameters for transmission of the requested information to the UE via a transmitter UE; and transmitting, to the serving network entity, the requested information for transmission to the UE through the transmitter UE based on the identified parameters.

Certain aspects provide a method for wireless communication by a receiver user equipment (UE) in a vehicle-to-everything (V2X) system. The method generally includes transmitting, to a network entity, a request for information from a vehicle-to-everything (V2X) application server, wherein the request includes an indication of a type of the requested information and a location of the UE; and receiving, from a transmitter UE, the requested information.

Certain aspects provide a method for wireless communication by a transmitter user equipment (UE) in a vehicle-to-everything (V2X) system. The method generally includes receiving, from a network entity, information requested by a UE connected with the transmitter UE and one or more parameters for transmitting the requested information to the UE; and transmitting the requested information to the UE via a sidelink connection between the UE and the transmitter UE based on the one or more parameters.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
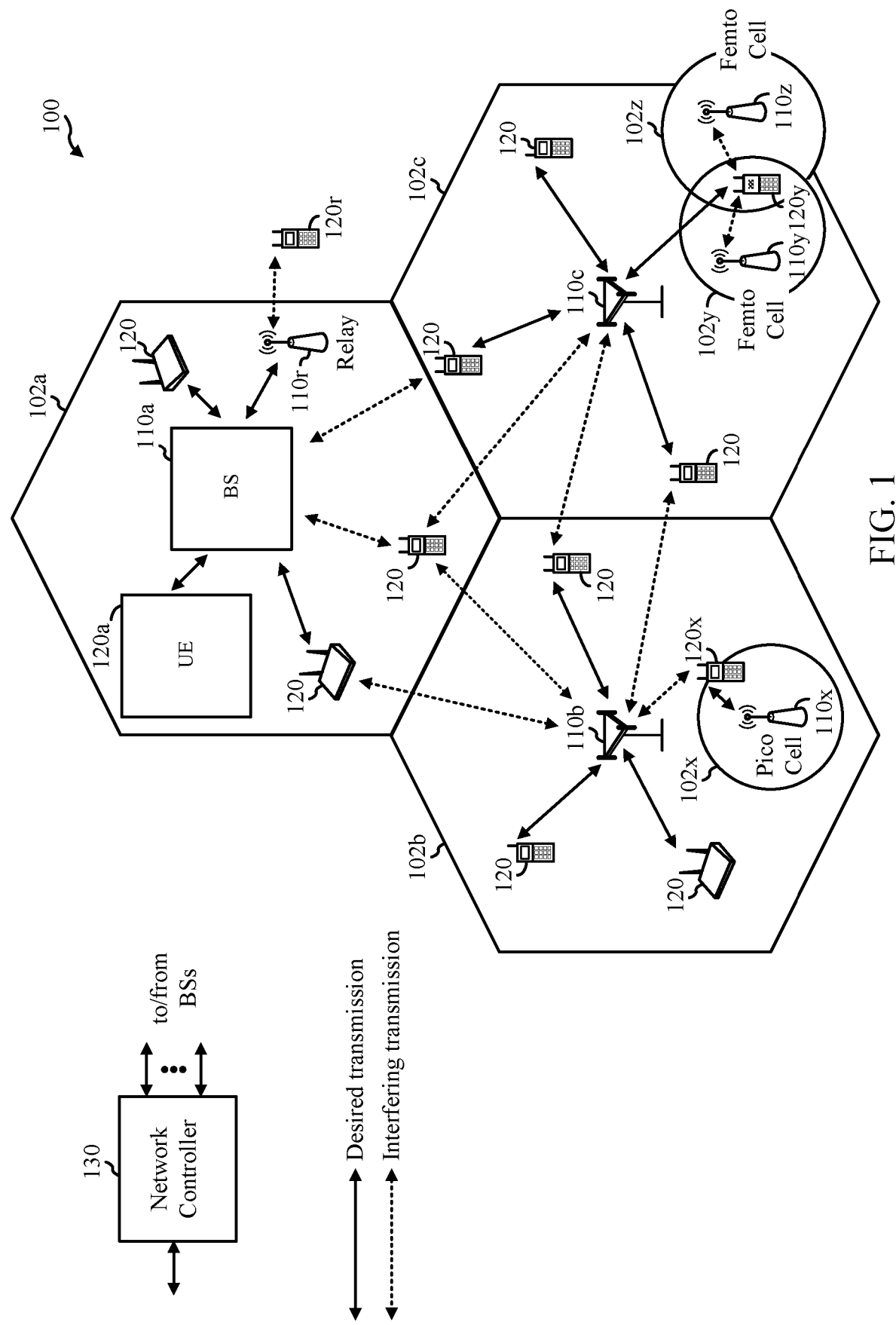
FIG. 1 is a block diagram conceptually illustrating an example telecommunications system, in accordance with certain aspects of the present disclosure.

Aspects of the present disclosure provide apparatus, methods, processing systems, and computer readable mediums for reliably communicating in vehicle-to-everything (V2X) systems using both sidelink and network link interfaces. Generally, a UE (e.g., a vehicle UE) may attempt to receive and decode requested information from a transmitter UE via a sidelink (e.g., PC5) connection. If the UE fails to successfully receive and decode the requested information from the transmitter UE, the UE can request the information from a serving network entity via a network link (e.g., Uu) connection. By using both sidelink and network link connections to serve requested information to a requesting UE, reliability of communications in V2X systems may be improved.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UEs 120a FIG. 1 may be V2X (vehicle-to-everything) or V2V (vehicle-to-vehicle) UEs or include V2X or V2V UEs configured to perform operations described below with reference to FIGS. 7-8 to process signals using a first radio access technology and a second radio access technology in an environment where devices supporting the first radio access technology and dual-mode devices supporting the first and second radio access technologies coexist.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices. The UEs illustrated in FIG. 1 may be, in some embodiments, V2X UEs or vehicles including UEs that can perform the operations illustrated in FIG. 7 or 8 discussed below.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
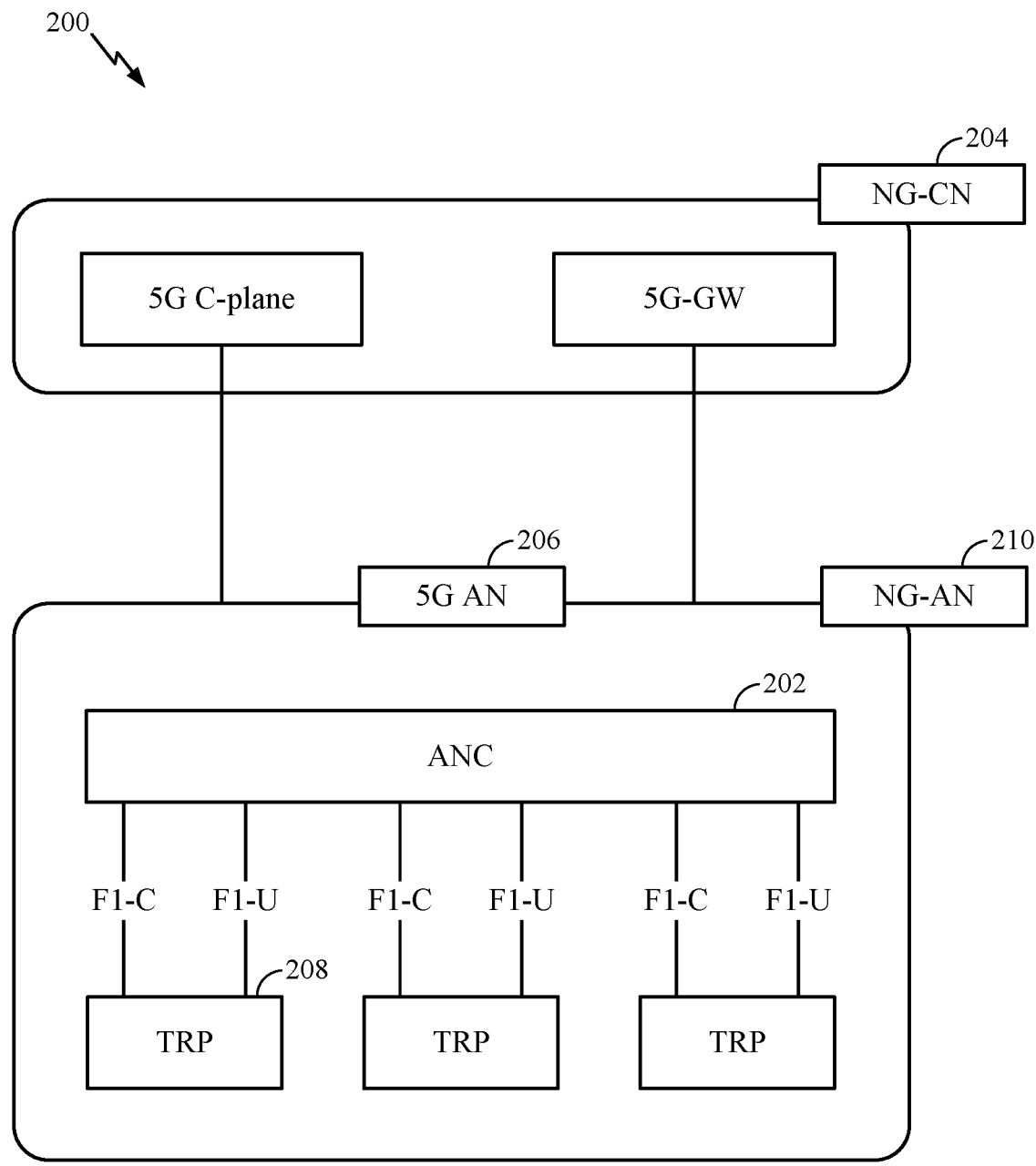
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
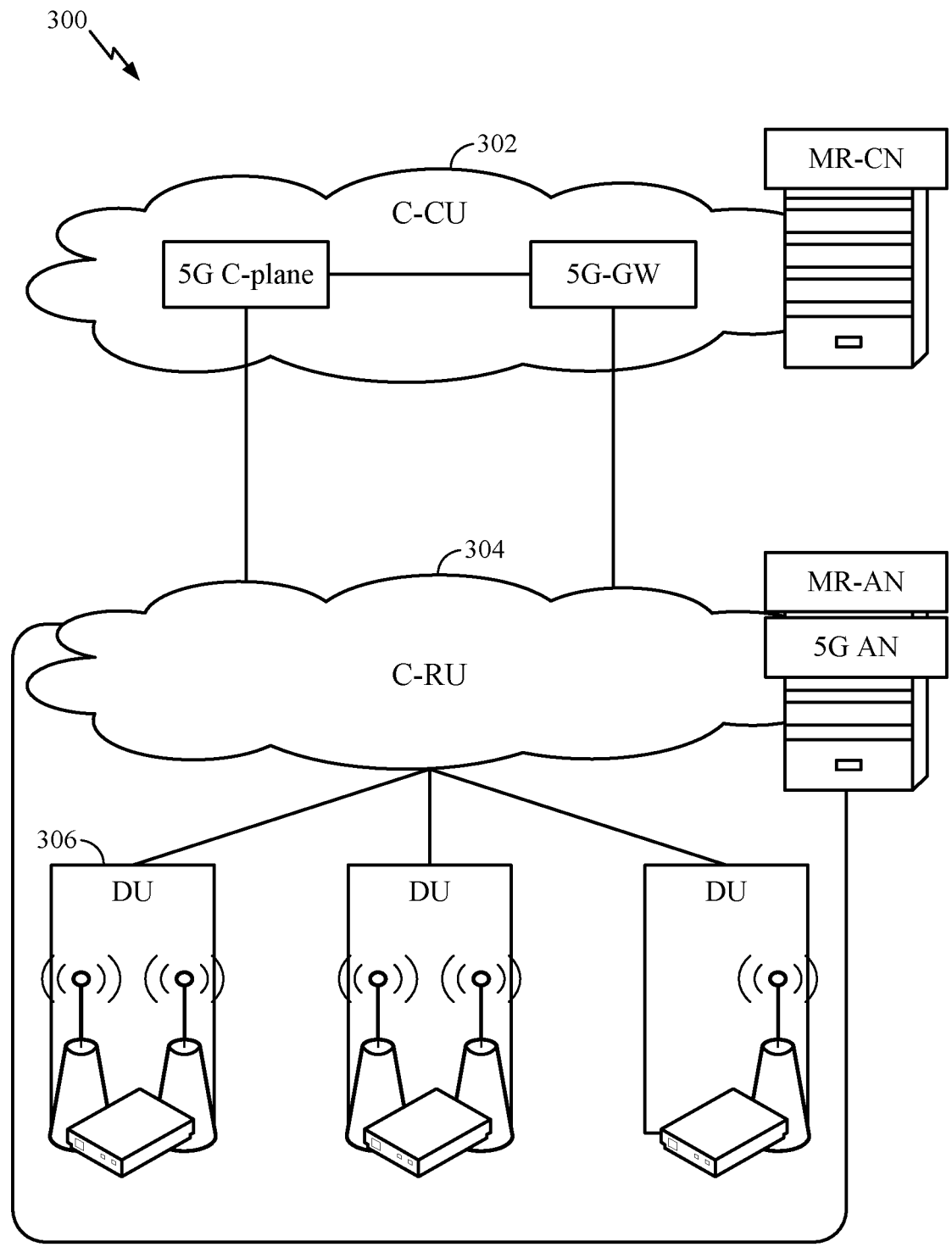
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
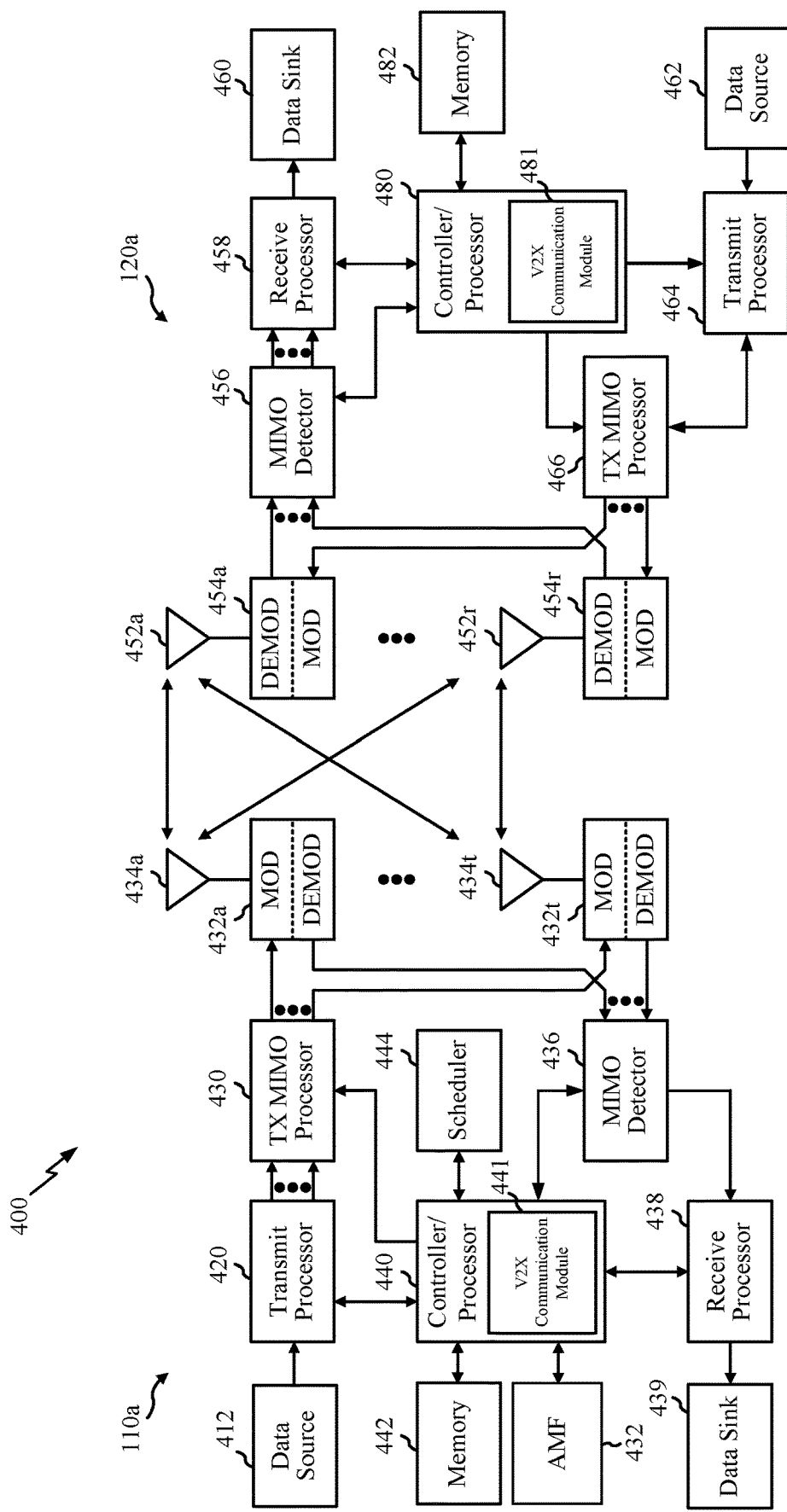
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein with reference to FIGS. 8-10.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. For example, as shown in FIG. 4, the controller/processor 440 of the BS 110a has a V2X communication module 441 that may be configured for receiving requests for information from a UE and transmitting the requested information to a transmitter UE and/or the requesting UE. As shown in FIG. 4, the controller/processor 480 of the UE 120a has a V2X communication module 481 that may be configured for receiving requested information from a V2X application server via one or more of a sidelink connection or a network link connection, according to aspects described herein. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5:
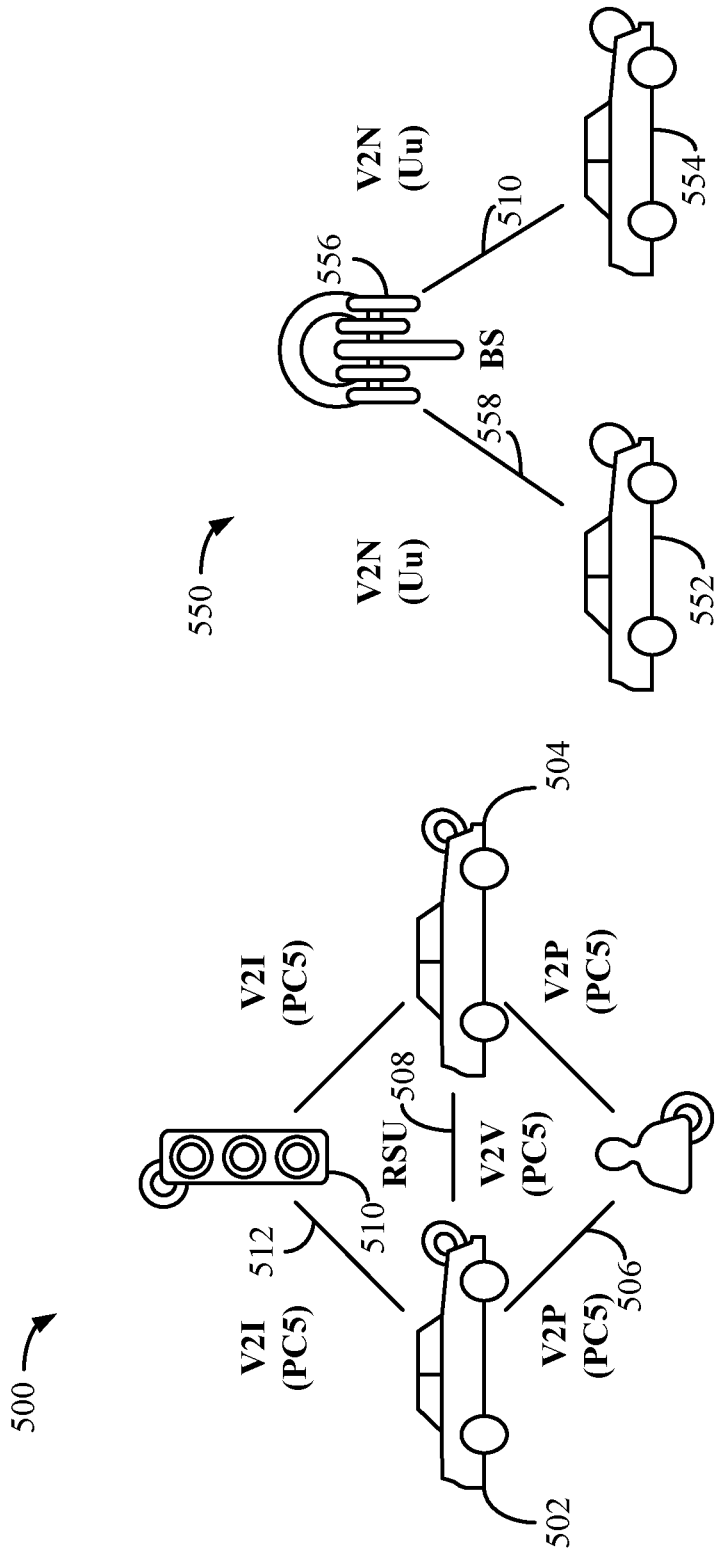
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

Example High Reliability Communications in Vehicle-to-Everything (V2X) Systems Using Sidelink and Network Link Connections Aspects of the present disclosure provide apparatus, methods, processing systems, and computer readable mediums for reliably communicating in vehicle-to-everything (V2X) systems by using sidelink and network link connections to communicate with UEs (e.g., vehicles) in a V2X system.

Vehicle-to-everything (V2X) services may allow for various vehicle-based communications systems to be implemented. For example, V2X services may be implemented as vehicle-to-vehicle (V2V) services, vehicle-to-pedestrian (V2P) services, vehicle-to-infrastructure (V2I) services, vehicle-to-network (V2N) services, and the like. Generally, V2X services may leverage one or both of sidelink (PC5) and network link (Uu) communication links based on the specific details of each service. In some examples, V2N services may take advantage of existing network infrastructure to allow services, such as map downloads, software downloads, updates, and the like, to be performed between vehicle UEs and V2X application servers via a cellular network. Further, V2N services operating on a cellular network over a large communications area may coexist with V2V, V2P, and V2I services that implement communications using sidelink connections over short distances.

Figure 6:
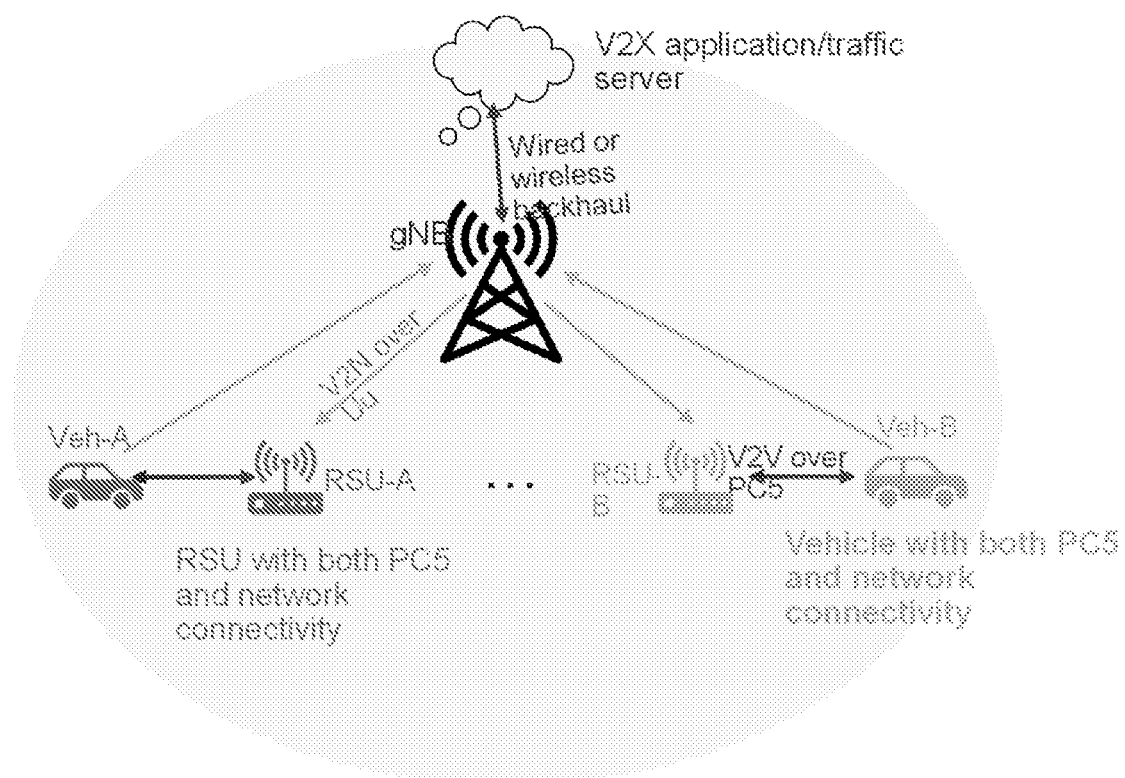
FIG. 6 illustrates communications between a vehicle-to-everything (V2X) application server, a roadside unit (RSU), and a vehicle in a V2X system over sidelink and radio network link connections, in accordance with certain aspects of the present disclosure.

FIG. 6 illustrates an example of communications between a vehicle-to-everything (V2X) application server, a roadside unit (RSU), and a vehicle in a V2X system over sidelink and radio network link connections. In this example, UEs may communicate with other UEs over a sidelink or a radio network link connection (e.g., over a PC5 connection or a Uu connection) for the transmission and reception of V2X messages. UEs that are in coverage of a gNodeB may transmit requests for specific V2X services over a network link connection between the UE (e.g., vehicle) and the gNodeB, and the requested information may be transmitted over both the network link and sidelink interfaces. To efficiently use spectrum, UE-type roadside units (RSUs) may have both sidelink (PC5) and network link (Uu) connectivity. These RSUs may thus be able to forward received packets from a V2X application server to in-range UEs over a sidelink connection between the RSUs and the in-range UEs.

Figure 7:
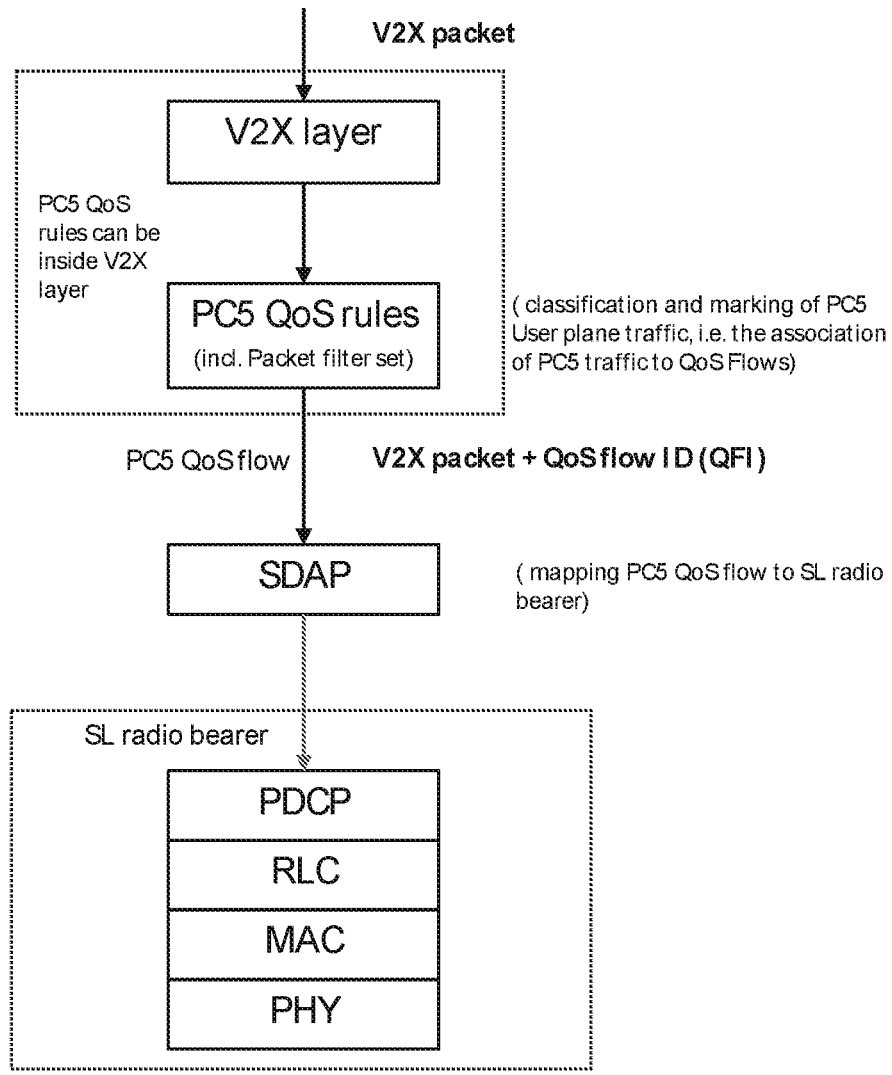
FIG. 7 illustrates the application of quality of service (QoS) rules to packets in vehicle-to-everything (V2X) communications, in accordance with certain aspects of the present disclosure.

FIG. 7 illustrates the application of quality of service (QoS) parameters to V2X communications, in accordance with certain embodiments. As illustrated, a V2X packet received at a transmitter UE (e.g., an RSU with a Uu connection to a gNodeB and a PC5 connection to a requesting UE) may be passed through a V2X layer, and PC5 QoS rules may be applied to the V2X packet. In a PC5 (sidelink) QoS flow, the V2X packet and a QoS flow ID may be passed to a service data adaptation protocol (SDAP) layer to generate a service layer radio bearer, then passed through successively higher layers of a network stack for transmission to the requesting UE. The QoS parameters applicable to a packet may be indicated at the application layer and may include parameters that are applied on a per-flow or a per-packet basis. Parameters applied on a per-flow basis may include, for example, a resource type (guaranteed bit rate (GBR), delay critical GBR, non-GBR), a priority level, a packet delay budget, a packet error rate, an averaging window (e.g., for GBR and delay-critical GBR resources), a maximum data burst volume (e.g., for delay-critical GBR resources), and the like. Parameters applied on a per-packet basis may include a range parameter identifying a minimum distance for which QoS parameters are to be fulfilled. The distance may be defined, for example, as a unit of meters from the RSU and may be omnidirectional.

While these QoS parameters may allow for some improvement in reliability of communications in V2X systems, omnidirectional QoS parameters and omnidirectional transmission of data by a transmitter UE (e.g., an RSU) may be inefficient for many reasons. For example, packets may be intended for UEs traveling in a specific direction. Transmitting these packets omnidirectionally (e.g., in a broadcast transmission along all directions on which the RSU can transmit) may waste resources, as the data in these packets may be applicable only to a subset of UEs connected to the RSU via a sidelink connection. Additionally, while QoS parameters may define a quality of service for various transmissions, situations may exist in which a transmitter UE is (1) unable to satisfy the QoS requirements for a transmission and (2) unable to ultimately ensure that the receiving UE is able to successfully receive and decode requested data.

To enhance the robustness and reliability of communications in V2X systems, embodiments described herein allow devices in a V2X system to communicate using directional parameters and by switching between sidelink (PC5) and network link (Uu) connections when sidelink transmission fails. As discussed in further detail below, a V2X application server may indicate the range and direction (customized shape of transmission) according to specific types of V2X packets and/or geographic information to a UE vehicle and/or RSU. The range parameter may be an optional parameter and may, in some embodiments, be used for group-cast transmissions. For content sharing scenarios, a V2X application server may identify a specific RSU to be used in transmitting data to a requesting UE via a sidelink connection. The range may be defined in terms of a direction or customized shape based on a location of the RSU and the receiver UE for a specific packet transmission, which may improve resource utilization by allowing transmissions to be performed in other directions. Additionally, after an RSU or transmitter experiences a number of consecutive failures to transmit data to a receiver UE, a gNB may be able to transmit packets to the receiver UE via a network link connection to ensure that data is provided to each requesting UE.

Figure 8:
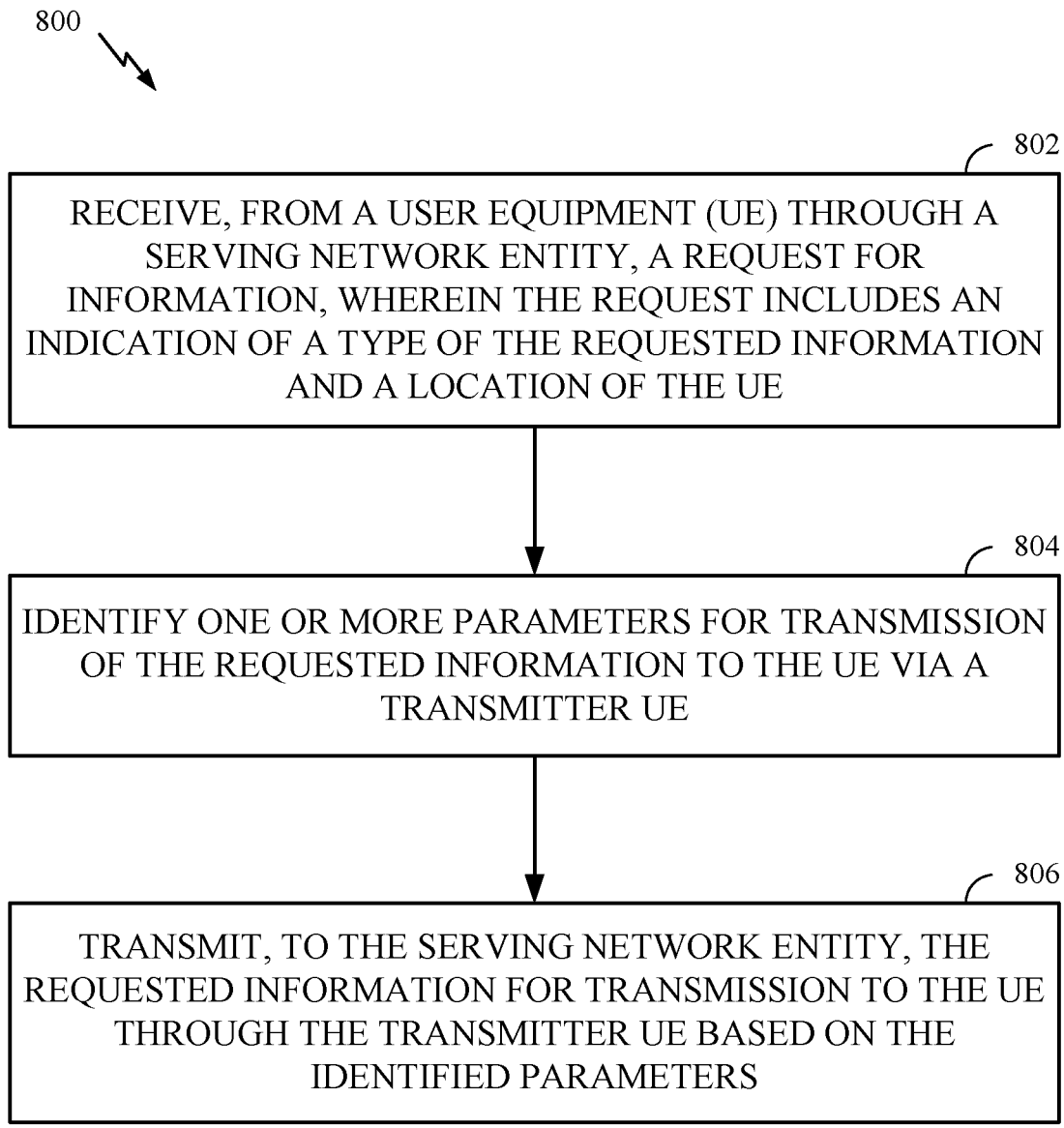
FIG. 8 illustrates example operations that may be performed by a vehicle-to-everything (V2X) application server to communicate with a user equipment (UE) via a sidelink connection and a network link connection, in accordance with certain aspects of the present disclosure.

FIG. 8 illustrates example operations 800 that may be performed by a V2X application server for reliably communicating in vehicle-to-everything (V2X) systems by using sidelink and network link connections, according to embodiments described herein. As illustrated, operations 800 begin at block 802, where the V2X application server receives, from a user equipment (UE) through a serving network entity, a request for information. The request generally includes an indication of a type of the requested information and a location of the UE.

At block 804, the V2X application server identifies one or more parameters for transmission of the requested information to the UE via a transmitter UE.

At block 806, the V2X application server transmits, to the serving network entity, the requested information for transmission to the UE through the transmitter UE based on the identified parameters.

Figure 9:
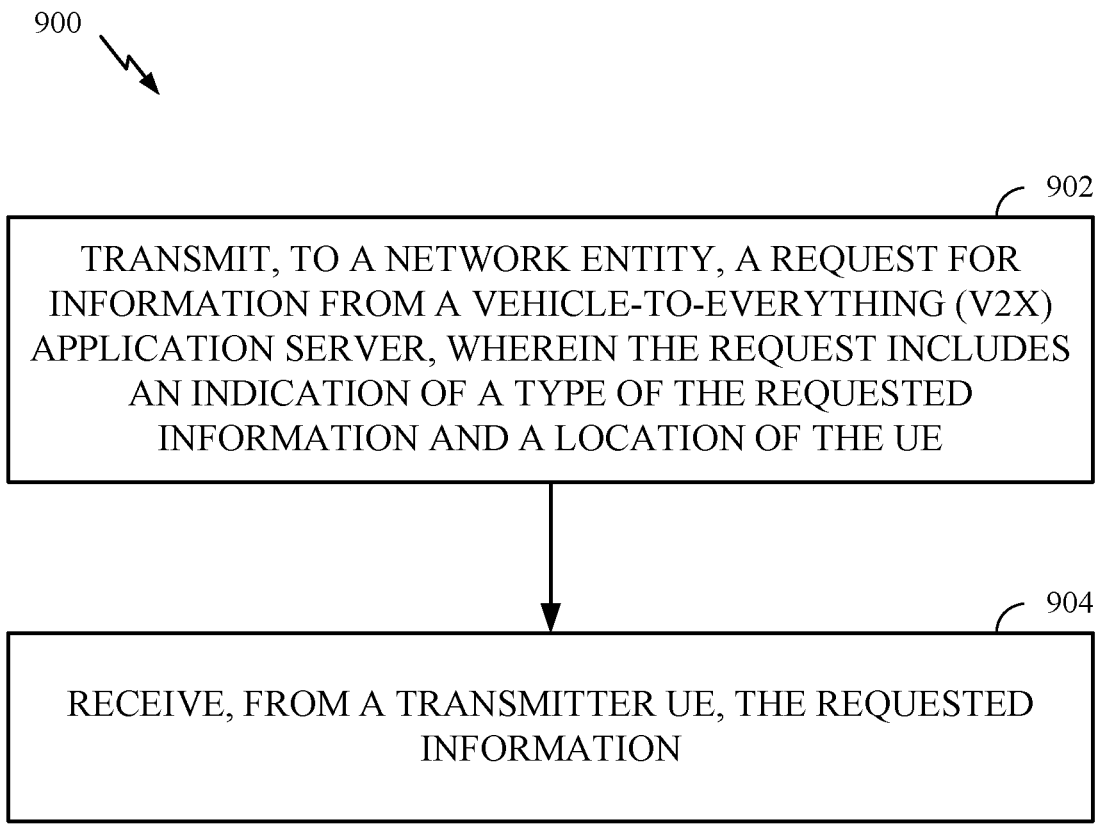
FIG. 9 illustrates example operations that may be performed by a receiver UE to process signals in a vehicle-to-everything (V2X) environment in which communications are performed via a sidelink connection and a network link connection, in accordance with certain aspects of the present disclosure.

FIG. 9 illustrates example operations 900 that may be performed by a user equipment (UE) for reliably communicating in vehicle-to-everything (V2X) systems by using sidelink and network link connections, according to embodiments described herein. As illustrated, operations 900 may begin at block 902, where a UE transmits, to a network entity, a request for information from a vehicle-to-everything (V2X) application server. The request generally includes an indication of a type of the requested information and a location of the UE.

At block 904, the UE receives, from a transmitter UE, the requested information.

Figure 10:
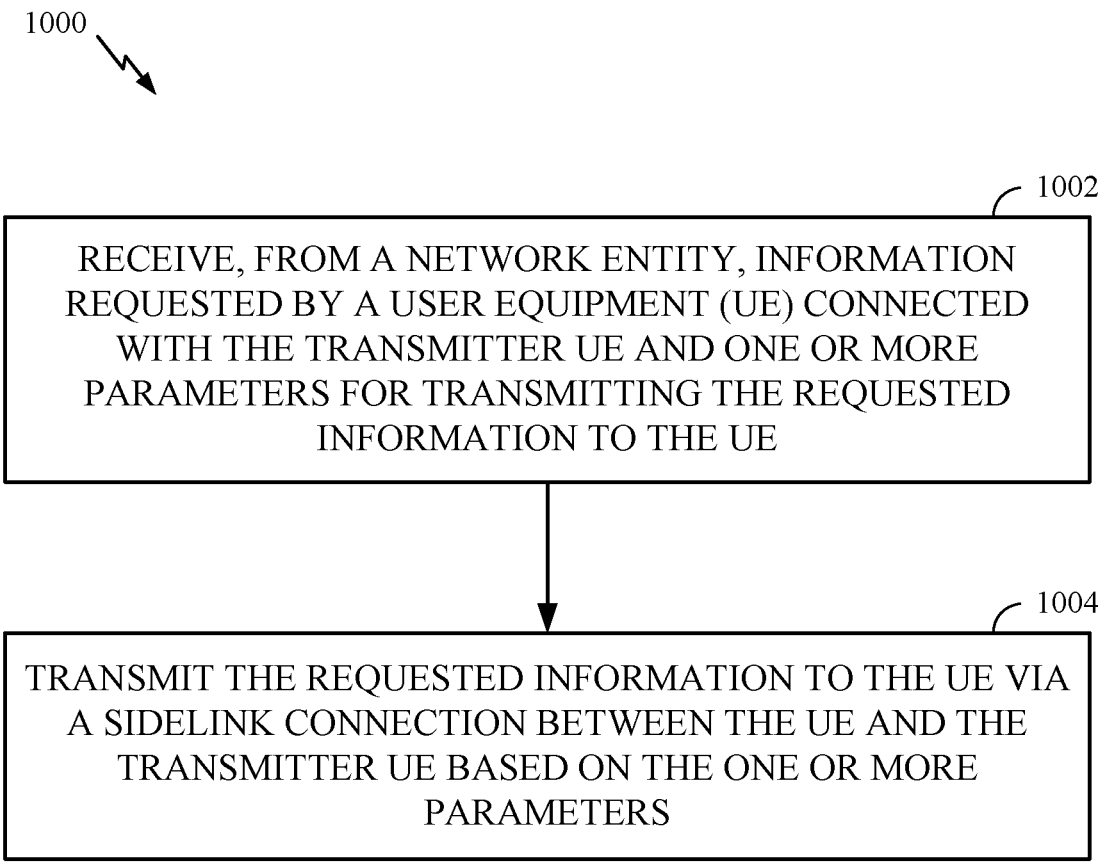
FIG. 10 illustrates example operations that may be performed by a transmitter UE to process signals in a vehicle-to-everything (V2X) environment in which communications are performed via a sidelink connection and a network link connection, in accordance with certain aspects of the present disclosure.

FIG. 10 illustrates example operations 1000 that may be performed by a transmitter UE (e.g., an RSU) for reliably communicating in vehicle-to-everything (V2X) systems by using sidelink and network link connections, according to embodiments described herein. As illustrated, operations 1000 may begin at block 1002, where the transmitter UE receives, from a network entity, information requested by a UE connected with the transmitter UE and one or more parameters for transmitting the requested information to the UE.

AT block 1004, the transmitter UE transmits the requested information to the UE via a sidelink connection between the UE and the transmitter UE based on the one or more parameters.

In some embodiments, a V2X application server may instruct a specific transmitter UE (e.g., RSU) to serve a UE that has requested data from the V2X application server. In an operation mode where both sidelink and network link connections may be used to serve the UE, the application server may receive the V2X request via a Uu connection between the UE and the serving network entity (e.g., serving gNodeB). The V2X application server may determine the target area and the size of the area in which the packet transmission for the requested data is to be directed (e.g., at what range the packet should be transmitted from a specific RSU to a specific UE). As discussed, the UE, when requesting data from the V2X application server, may identify the type of data being requested from the V2X application server (e.g., map data, software updates, etc.) and the current location of the UE (e.g., in relation to a serving cell, latitude/longitude information determined by a satellite positioning system (SPS) such as NAVSTAR GPS, GALILEO, etc., or the like). Because the application server may be aware of the location of a requesting UE and the RSUs in the V2X environment, the application server may identify an optimal RSU to use to serve the requesting UE. The identified RSU may be selected based on a range and location of the UE and the RSU such that the closest RSU is selected to forward data to the UE.

In some embodiments, the range defined for a transmitter UE need not be circular. The range may be defined in terms of a direction from the transmitter UE according to the type of the requested data and/or the location of the transmitter UE and the requesting UE. For example, oval shaped communication areas may be used to enhance high-priority traffic or to direct data transmissions to receivers in a specific direction of the transmitter UE. In some embodiments, range parameters may be used for unicast transmissions as well as groupcast transmissions. A transmitter UE may, for example, identify an importance of a transmission in a specific direction for a specific UE and apply various QoS parameters to traffic in that specific direction to improve the reliability of communications with the requested UE. In some embodiments, where no direction is identified by the V2X server, the transmission may be an omni-directional transmission.

Figure 11:
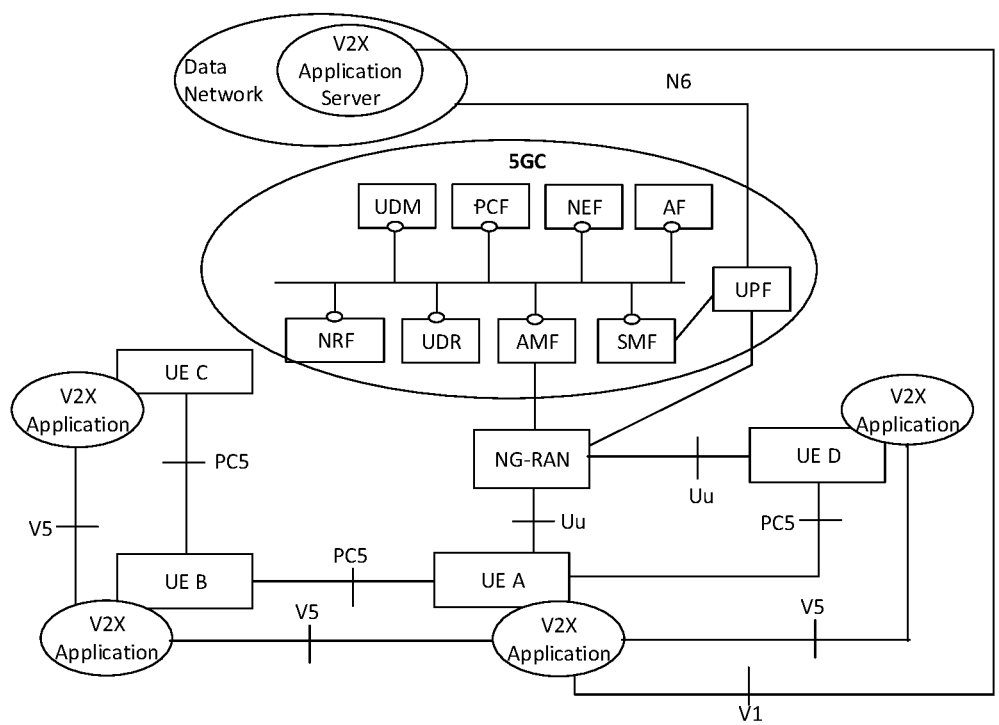
FIG. 11 illustrates an example architecture for communicating in a vehicle-to-everything (V2X) environment in which communications are performed via a sidelink connection and a network link connection, in accordance with certain aspects of the present disclosure.

After the V2X application server identifies parameters for transmitting requested data to a requesting UE, the V2X application server may provision these parameters to an identified transmitter UE (RSU) over a network link connection, as illustrated in FIG. 11. The V2X application server may provision the core network (5GC network illustrated in FIG. 11) with directional range parameters for V2X communications over a sidelink (PC5) connection. A policy control function (PCF) in the core network may provision the access and mobility management function (AMF), and the AMF may provision the NG-RAN (network entity) with the sidelink QoS parameters for V2X communications for the requested data. The QoS parameters used for V2X communications over a sidelink may be generated by the application server and transmitted to one or both of the requesting UE (e.g., a vehicle UE) or a transmitting UE (e.g., a UE-type RSU) over a network link connection and may include the direction and range information discussed above.

In some embodiments, V2X packets may be associated with customized range and direction indications, as discussed above. To indicate a directional transmission, the application server may set an extended range indication in the QoS parameters. The medium access control (MAC) entity of the transmitter UE (RSU) may choose a HARQ feedback range based on the range to ensure that all receivers for which the packet is intended has correctly decoded the packet. The HARQ feedback range may be omnidirectional, oval, or customized based on the packet type and location information of the requesting UE and the transmitting UE. The range and direction indication for data included in a packet to be forwarded to a requesting UE via a sidelink connection may be applied on a per-QoS-flow or a per-packet basis based on an indication in the V2X packet.

To enhance reliability of communications in V2X systems, UEs within the HARQ feedback range identified in a V2X packet may transmit acknowledgment (ACK) or negative acknowledgment (NACK) information to the transmitting UE (RSU) based on whether each UE has successfully received and decoded the V2X packet. To ensure that each intended receiver has successfully received the V2X packet, the transmitter UE may forward the HARQ ACK/NACK feedback to a serving gNodeB, and the serving gNodeB can determine whether to retransmit the packet to a specific UE over a network link (e.g., Uu) connection. For example, if a transmitter UE has failed to successfully transmit a V2X packet to a requesting UE for a threshold number of times, the gNodeB can transmit the V2X packet to the requesting UE via a Uu connection between the gNodeB and the requesting UE, thus bypassing the sidelink connection between the requesting UE and the transmitter UE (which may be an unstable connection).

In some embodiments, the requesting UE may request retransmission of the V2X packet from the serving gNodeB. To do so, the requesting UE may, for example, transmit a negative acknowledgment (NACK) to the serving gNodeB via a network link (e.g., Uu) connection between the receiving UE and the serving gNodeB. In response, the gNodeB can transmit the V2X packet directly to the requesting UE, bypassing the sidelink connection between the requesting UE and the transmitter UE.

Upon receiving a NACK or other indication that the requesting UE failed to receive a V2X packet, various actions may be taken to retransmit the V2X packet to the requesting UE. As discussed, in some embodiments, the gNodeB can transmit the packet to the requesting UE via a network link connection. The gNodeB can transmit the packet to the requesting UE via a network link connection, for example, when the coverage or range of the selected transmitter UE (e.g., RSU) is not suitable for serving the requesting UE and no other transmitter UEs are in range of the requesting UE. In some embodiments, the application may select another transmitter UE to use to transmit the V2X packet to the requesting UE. The transmitter UE may be selected based, for example, on the movement and location of the requesting UE.

Figure 12:
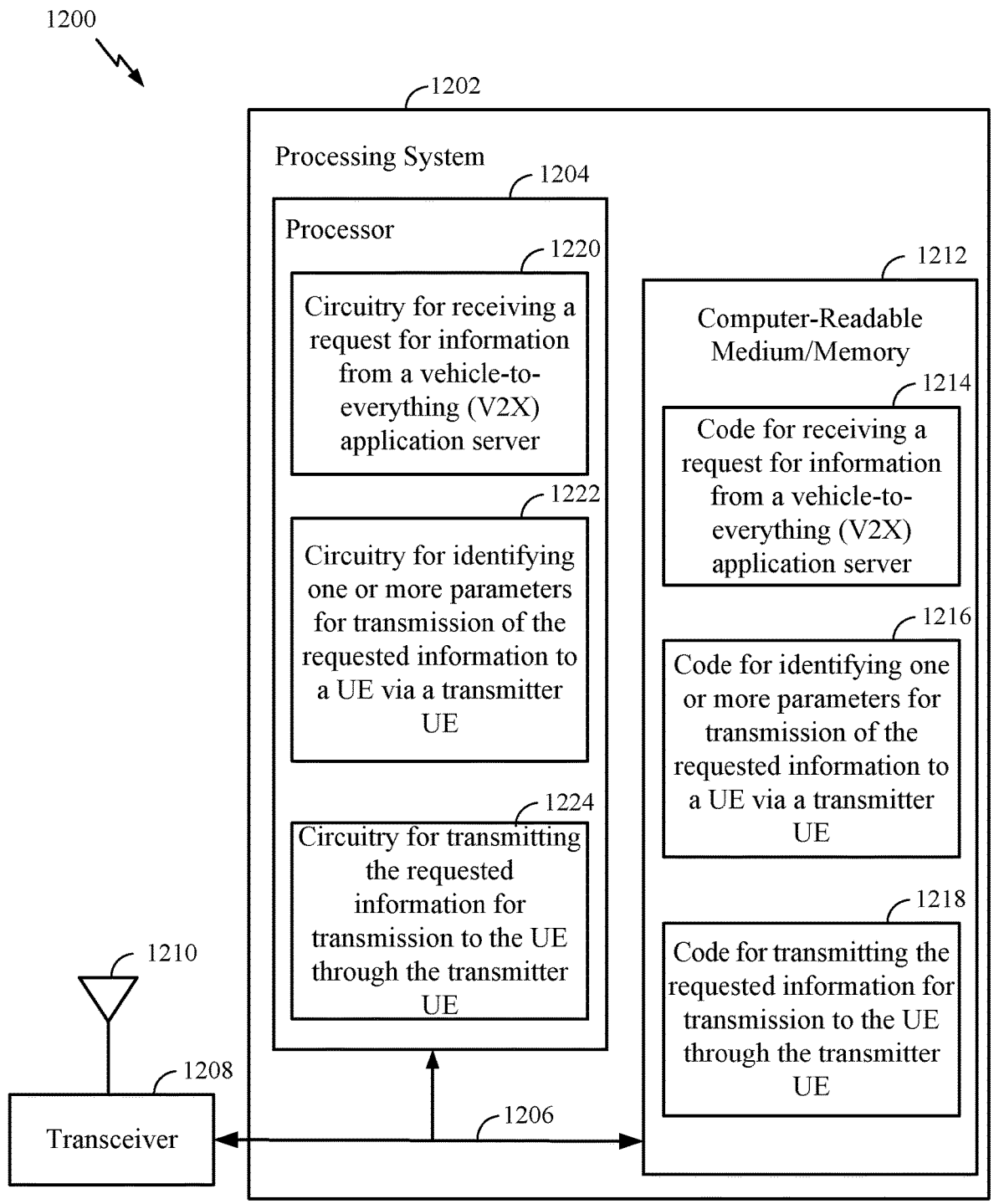
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 8, or other operations for performing the various techniques discussed herein. In certain aspects, computer-readable medium/memory 1212 stores code 1214 for receiving a request for information from a vehicle-to-everything (V2X) application server; code 1216 for identifying one or more parameters for transmission of the requested information to a UE via a transmitter UE; and code 1218 for transmitting the requested information for transmission to the UE through the transmitter UE. In certain aspects, the processor 1204 has circuitry configured to implement the code stored in the computer-readable medium/memory 1212. The processor 1204 includes circuitry 1220 for receiving a request for information from a vehicle-to-everything (V2X) application server; circuitry 1222 for identifying one or more parameters for transmission of the requested information to a UE via a transmitter UE; and circuitry 1224 for transmitting the requested information for transmission to the UE through the transmitter UE.

Figure 13:
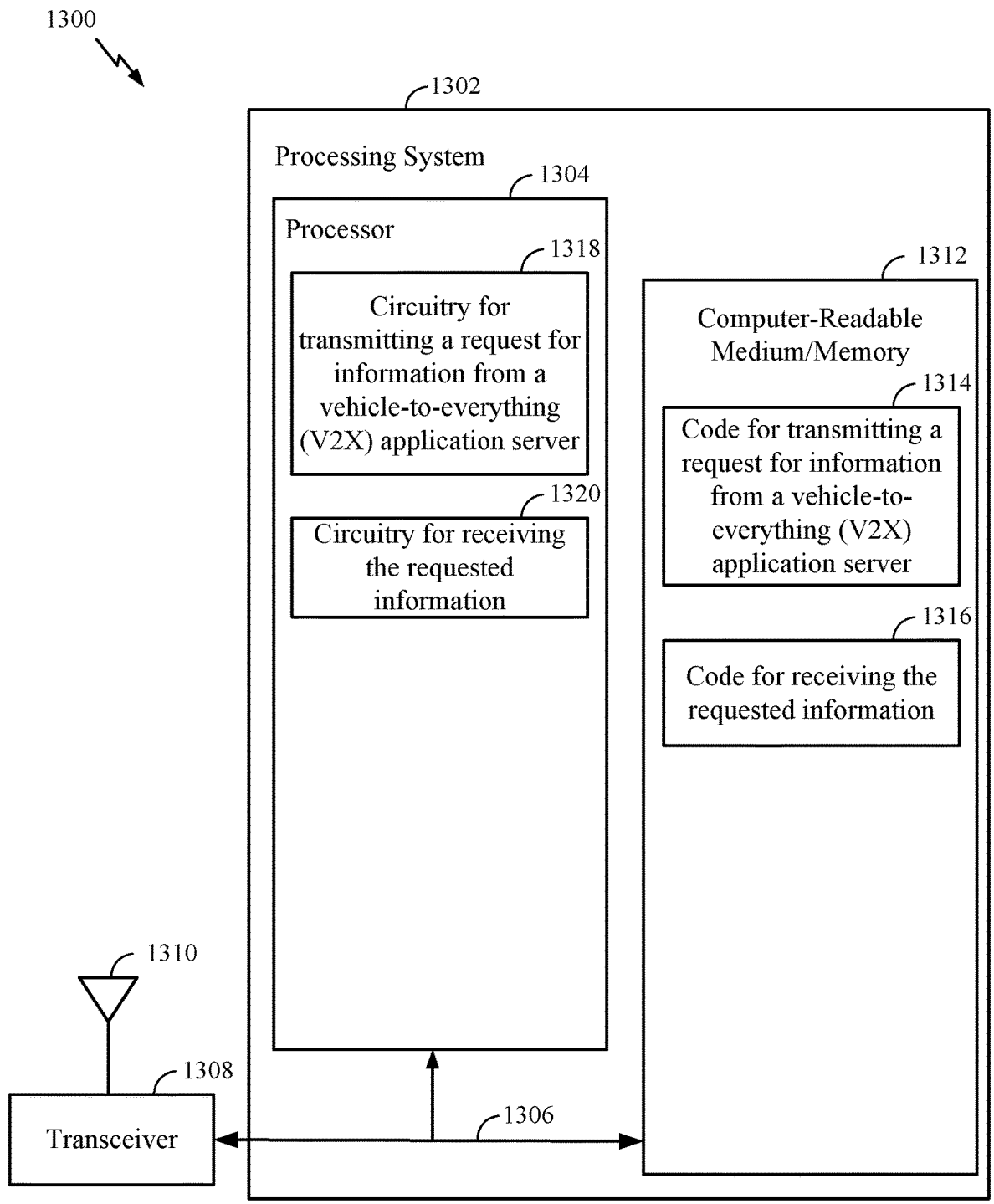
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein. In certain aspects, computer-readable medium/memory 1312 stores code 1314 for transmitting a request for information from a vehicle-to-everything (V2X) application server; and code 1316 for receiving the requested information. In certain aspects, the processor 1304 has circuitry configured to implement the code stored in the computer-readable medium/memory 1312. The processor 1304 includes circuitry 1318 for transmitting a request for information from a vehicle-to-everything (V2X) application server; and circuitry 1320 for receiving the requested information.

Figure 14:
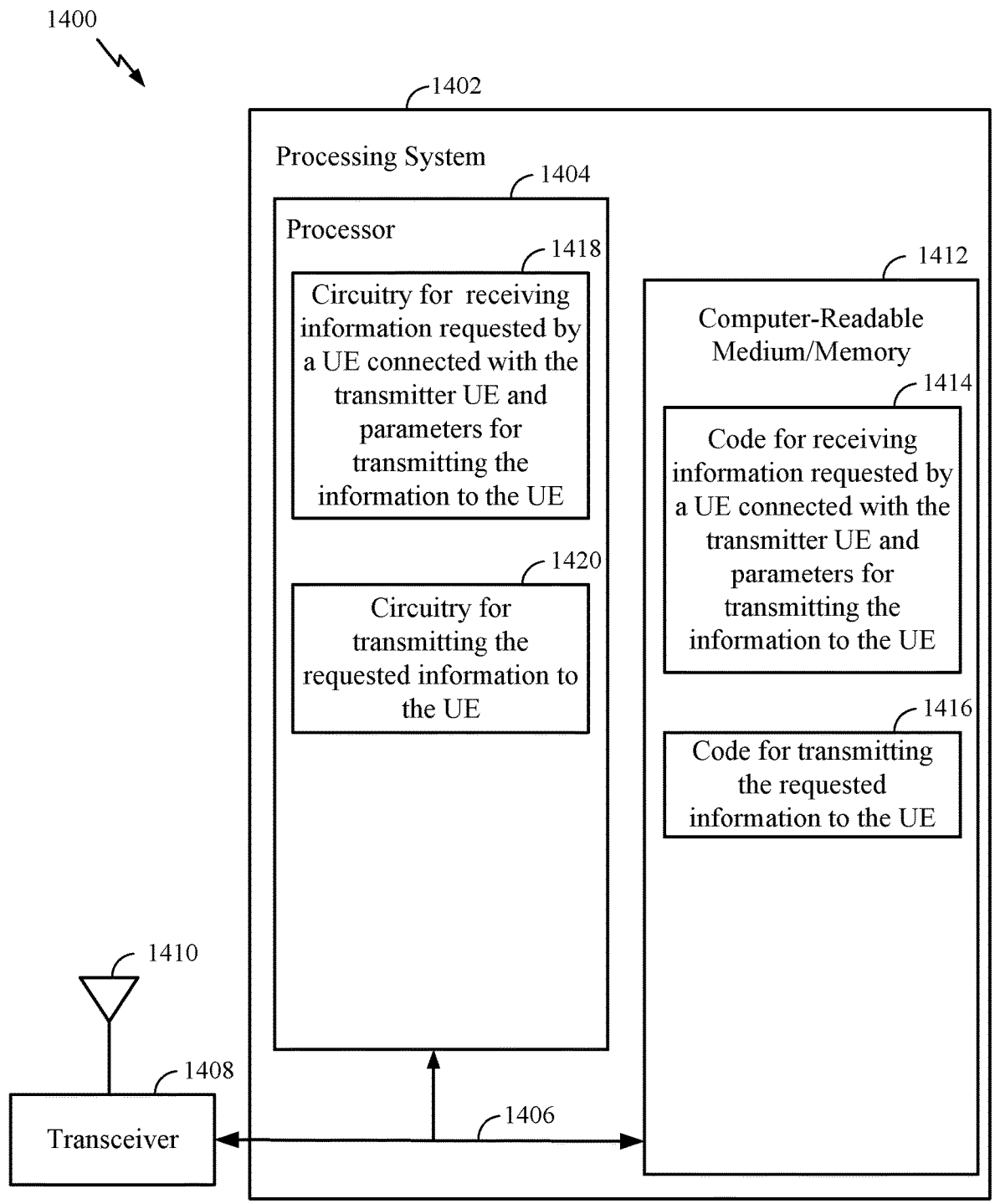
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/ memory 1412 is configured to store instructions (e.g., computer-executable code) that when executed by the processor 1404, cause the processor 1404 to perform the operations illustrated in FIG. 10, or other operations for performing the various techniques discussed herein. In certain aspects, computer-readable medium/memory 1412 stores code 1414 for receiving information requested by a UE connected with a transmitter UE and parameters for transmitting the information to the UE; and code 1416 for transmitting the requested information to the UE. In certain aspects, the processor 1404 has circuitry configured to implement the code stored in the computer-readable medium/memory 1412. The processor 1404 includes circuitry 1418 for receiving information requested by a UE connected with a transmitter UE and parameters for transmitting the information to the UE; and circuitry 1420 for transmitting the requested information to the UE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 7-8 may be performed by various processors shown in FIG. 4, such as processors 466, 458, 464, and/or controller/processor 480 of the UE 120*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a vehicle-to-everything (V2X) application server, comprising:
   receiving, from a user equipment (UE) through a serving network entity, a request for information from the V2X application server, wherein the request includes an indication of a type of the requested information and a location of the UE at a time of transmission of the request by the UE;
   identifying one or more parameters for transmission of the requested information to the UE via a transmitter UE or a roadside unit (RSU); and
   transmitting, to the serving network entity, the requested information for transmission to the UE through the transmitter UE or the RSU based on the identified parameters.

2. The method of claim 1, wherein the identified one or more parameters comprises a range parameter and a direction of transmission parameter specifying a direction for the transmitter UE or the RSU to use in transmitting the requested information to the UE.

3. The method of claim 2, wherein the range parameter comprises an extended range indication used by the transmitter UE or the RSU to determine a valid range for transmitting the requested information.

4. The method of claim 2, wherein the direction of transmission parameter identifies a shape of a transmission performed by the transmitter UE or the RSU.

5. The method of claim 1, further comprising:
   configuring the network entity to transmit the requested information to the UE via a Uu connection between the UE and the network entity upon determining that the transmitter UE or the RSU failed to successfully transmit the requested information to the UE.

6. The method of claim 1, further comprising:
   receiving an indication that the UE failed to receive the requested information;
   selecting a second transmitter UE or a second RSU based on location and movement information reported by the UE; and
   transmitting, to the serving network entity, the requested information for transmission to the UE through the second transmitter UE or the second RSU .

7. The method of claim 1, further comprising:
selecting the transmitter UE or the RSU based on the location of the UE and positioning information for each of a plurality of transmitter UEs or RSUs.

8. The method of claim 1, wherein the one or more parameters are identified based on a type of the requested information.

9. The method of claim 1, further comprising:
transmitting, to the network entity, quality of service (QOS) parameters for transmitting the requested information to the UE.

10. The method of claim 9, wherein the QoS parameters comprise a valid range from the transmitter UE or the RSU for the requested information.

11. A method for wireless communications by a user equipment (UE), comprising:
transmitting, to a network entity, a request for information from a vehicle-to-everything (V2X) application server, wherein the request includes an indication of a type of the requested information and a location of the UE at a time of transmission of the request by the UE; and
receiving, from a transmitter UE or a roadside unit (RSU), the requested information.

12. The method of claim 11, further comprising:
receiving one or more quality of service (QOS) parameters from the transmitter.

13. The method of claim 12, wherein the one or more QoS parameters includes a valid range from the transmitter UE or the RSU for the requested information, and wherein the method further comprises:
determining, based on a distance between the UE and the transmitter UE or the RSU and the valid range from the transmitter UE or the RSU for the requested information, that the UE is an intended recipient of the requested information; and
transmitting, to the transmitter, a hybrid automatic repeat request (HARQ) acknowledgment (ACK) or negative acknowledgment (NACK) based on whether the requested information can be successfully decoded.

14. The method of claim 11, further comprising:
requesting, from the transmitter UE or the RSU, retransmission of the requested information for a threshold number of times;
failing to successfully receive the requested information for the threshold number of times; and
based on failing to successfully receive the requested information for the threshold number of times, transmitting, to the network entity, an indication that the transmitter UE or the RSU failed to transmit the requested information to the UE.

15. The method of claim 14, further comprising:
receiving the requested information from the network entity via a Uu connection between the UE and the network entity.

16. The method of claim 14, further comprising:
receiving the requested information from a second network entity.

17. A method for wireless communications by a transmitter user equipment (UE) or a roadside unit (RSU), comprising:
receiving, from a network entity, information requested by a UE connected with the transmitter UE or the RSU and one or more parameters for transmitting the requested information to the UE, based on a request of the UE comprising an indication of a type of the information requested and a location of the UE at a time of transmission of the request by the UE; and
transmitting the requested information to the UE via a sidelink connection between the UE and the transmitter UE or the RSU based on the one or more parameters.

18. The method of claim 17, wherein the identified one or more parameters comprises a range parameter and a direction of transmission parameter specifying a direction for the transmitter UE or the RSU to use in transmitting the requested information to the UE.

19. The method of claim 18, wherein the range parameter comprises an extended range indication used by the transmitter UE or the RSU to determine a valid range for transmitting the requested information.

20. The method of claim 18, wherein the direction of transmission parameter identifies a shape of a transmission performed by the transmitter UE or the RSU.

21. The method of claim 17, further comprising:
receiving hybrid automatic repeat request (HARQ) feedback from the UE indicating whether the UE successfully received the requested information.

22. The method of claim 21, wherein the HARQ feedback is received from UEs within a specified distance from the transmitter UE or the RSU.

23. The method of claim 21, further comprising:
retransmitting the requested information to the UE based on receiving HARQ negative acknowledgment (NACK) feedback from the UE.

24. The method of claim 23, further comprising:
forwarding the HARQ NACK feedback to the network entity.

25. The method of claim 23, further comprising:
determining that the UE has failed to successfully receive the requested information for a threshold number of times; and
transmitting an indication to the network entity to trigger the network entity to transmit the requested information directly to the UE via a Uu connection.

26. An apparatus for wireless communications by a vehicle-to-everything (V2X) application server, comprising:
one or more memories comprising instructions; and
one or more processors, individually or collectively, configured to execute the instructions and cause the apparatus to:
receive, from a user equipment (UE) through a serving network entity, a request for information from the V2X application server, wherein the request includes an indication of a type of the requested information and a location of the UE at a time of transmission of the request by the UE;
identify one or more parameters for transmission of the requested information to the UE via a transmitter UE or a roadside unit (RSU); and
transmit, to the serving network entity, the requested information for transmission to the UE through the transmitter UE or the RSU based on the identified parameters.

27. An apparatus for wireless communications by a user equipment (UE), comprising:
one or more memories comprising instructions; and
one or more processors, individually or collectively, configured to execute the instructions and cause the apparatus to:
transmit, to a network entity, a request for information from a vehicle-to-everything (V2X) application server, wherein the request includes an indication of a type of the requested information and a location of the UE at a time of transmission of the request by the UE; and receive, from a transmitter UE or a roadside unit (RSU), the requested information.

28. An apparatus for wireless communications by a transmitter user equipment (UE) or a roadside unit (RSU), comprising:
one or more memories comprising instructions; and
one or more processors, individually or collectively, configured to execute the instructions and cause the apparatus to:
receive, from a network entity, information requested by a UE connected with the transmitter UE or the RSU and one or more parameters for transmitting the requested information to the UE, based on a request of the UE comprising an indication of a type of the information requested and a location of the UE at a time of transmission of the request by the UE; and
transmit the requested information to the UE via a sidelink connection between the UE and the transmitter UE or the RSU based on the one or more parameters.

29. An apparatus for wireless communications by a vehicle-to-everything (V2X) application server, comprising:
means for receiving, from a user equipment (UE) through a serving network entity, a request for information from the V2X application server, wherein the request includes an indication of a type of the requested information and a location of the UE at a time of transmission of the request by the UE;
means for identifying one or more parameters for transmission of the requested information to the UE via a transmitter UE or a roadside unit (RSU); and
means for transmitting, to the serving network entity, the requested information for transmission to the UE through the transmitter UE or the RSU based on the identified parameters.

30. An apparatus for wireless communications by a user equipment (UE), comprising:
means for transmitting, to a network entity, a request for information from a vehicle-to-everything (V2X) application server, wherein the request includes an indication of a type of the requested information and a location of the UE at a time of transmission of the request by the UE; and
means for receiving, from a transmitter UE or a roadside unit (RSU), the requested information.

31. An apparatus for wireless communications by a transmitter user equipment (UE) or a roadside unit (RSU), comprising:
means for receiving, from a network entity, information requested by a UE connected with the transmitter UE or the RSU and one or more parameters for transmitting the requested information to the UE, based on a request of the UE comprising an indication of a type of the information requested and a location of the UE at a time of transmission of the request by the UE; and
means for transmitting the requested information to the UE via a sidelink connection between the UE and the transmitter UE or the RSU based on the one or more parameters.

* * * * *